Sept. 27, 1949.  R. C. TRESEDER  2,482,812
ELECTRONIC SYNCHRONIZER

Filed Nov. 17, 1944  4 Sheets-Sheet 1

Fig 1

INVENTOR.
Robert C. Treseder
BY
ATTORNEYS

Patented Sept. 27, 1949

2,482,812

UNITED STATES PATENT OFFICE 2,482,812

ELECTRONIC SYNCHRONIZER

Robert C. Treseder, Dayton, Ohio

Application November 17, 1944, Serial No. 563,975

6 Claims. (Cl. 175—355)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in synchronizing apparatus of general application but particularly adapted for use in synchronizing airplane engines.

Electrical synchronizing apparatus of the type wherein an electrical current generated by a device driven by the prime mover to be controlled is compared with a reference frequency, and a synchronizing control derived in accordance with the difference in frequencies, are broadly old in the art. Systems of this character which have been developed for use in aircraft have generally involved a motor device for frequency comparison generally known as an electrical differential in which a rotatable element is movable in either direction from a neutral position upon a difference in the frequencies being compared; and the rotation of the said element in either direction being effective to control either through a governor or directly, a propeller pitch changing mechanism. Electrical mechanical synchronizing means as above outlined involves the transfer of considerable energy to the frequency comparing device in order to develop sufficient torque for operation so that the weight is considerable, which fact has prevented large scale use of such devices. Devices of the character described are generally capable only of on-off type of governing and hence subject to hunting, while proportional type of governing, i. e. where the governing control is proportional to the off speed condition, is desirable.

In accordance with the present invention the principle of utilizing a frequency comparing and discriminating device is employed but differing from known prior devices in utilizing gaseous discharge tubes in the frequency comparing and discriminating device and requiring the transmission of a very small amount of power from the respective engine driven frequency source and from the standard reference frequency source so that weight is reduced to a minimum. The use of gaseous discharge tubes also permits proportional control by impulses so that the rate of governor adjustment or control of supply of energy to the pitch changing motor will be such that the rate of speed correction will be proportional to the departure of engine speed from the preset standard.

In accordance with the present invention a three-phase alternator, preferably the tachometer alternator used for engine speed indication, is tapped to provide a three-phase current for the synchronizer unit. The currents in the three respective phase circuits are each passed through a respective coupling transformer primary coil, a second transformer also having a primary coil fed from a single phase, master or control frequency source for example derived from a master engine driven alternator or interrupter or from a separate adjustable frequency oscillator. The outputs from the secondaries of the respective coupling transformers are connected to the voltage biased control grids of gaseous discharge tubes. The currents in the primary coils of the coupling transformers are normally in phase opposition and the secondary current voltage rises to a predetermined critical value only when an off-speed condition prevails, at which time the currents in the primary coils come into phase a number of times equal to the difference between the frequencies being compared. The circuits are so arranged that certain of the tubes, upon the grid voltage reaching the critical value, can only fire sequentially in a certain order upon a speed increase and in a different sequential order upon a speed decrease. Upon the sequential firing of either of respective pairs of tubes, a vacuum tube relay is selectively energized to control the energizing of a governor modifier servomotor in impulses, or to control the supply of power directly to a propeller pitch changing servomotor in impulses, so that the average rate of pitch change is proportional to the off speed.

The principal object of the invention is the provision of a synchronizing system for prime movers of the character employing a frequency or speed comparing device for deriving a synchronizing control, the said device being of a character requiring a minimum of energy to be transferred to and from the comparing device to thereby effect a saving in weight.

Another object of the invention is the provision of a synchronizing system in which electronic means are provided for comparing electric currents one having a frequency proportional to the speed of the prime mover or the like to be controlled and the other having a frequency proportional to a preset standard or constant speed, the electronic means being operative to discriminate between speed increase and decrease respectively from the standard speed and effective to selectively control servo mechanism, such that the rate of speed correction is proportional to the deviation from the preset standard speed.

It is another object of the invention to provide an electronic frequency comparing device and relay control operative to discriminate in the sense of a change in frequency between two currents whose frequencies are being compared and to selectively actuate a controlling relay in accordance with the detected sense in such frequency change and the device being operative to operate the relay in impulses per unit time equal to the difference in frequencies of the currents being compared.

Other objects and features of the invention not specifically enumerated above will become apparent by reference to the detailed description of the invention hereinafter given and to the appended drawings in which.

Figure 1:
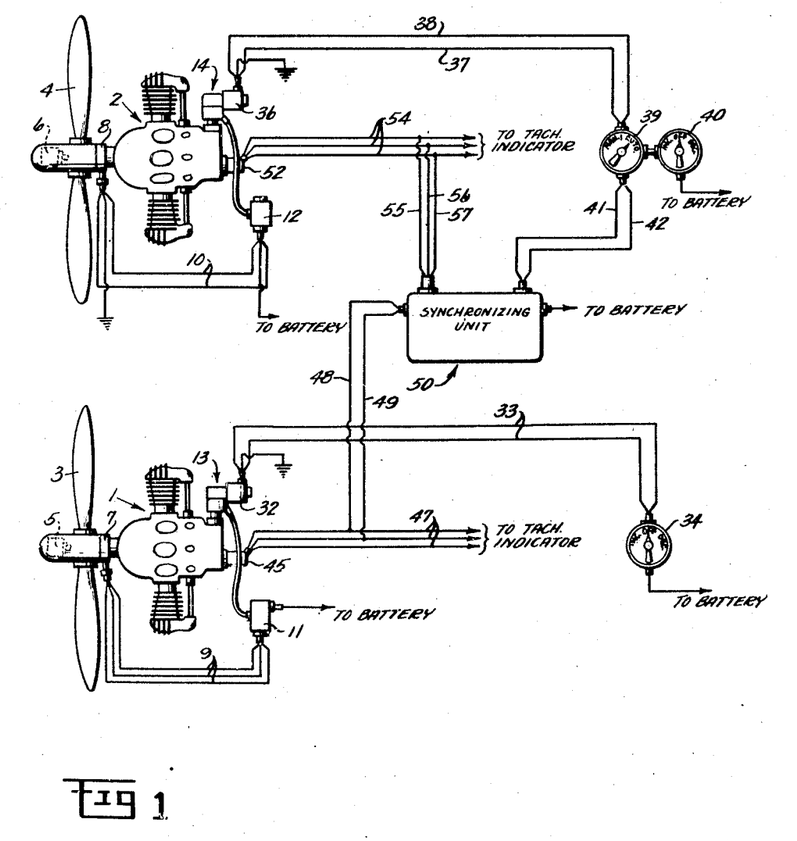
Fig. 1 is a schematic assembly view illustrating the elements of the invention as applied in a two engine aircraft power plant.

Referring now to Fig. 1, the reference characters 1 and 2 respectively indicate each of a pair of conventional aircraft engines whose speeds are to be synchronized, engine 1 being the master engine, the speed of which serves as a preset standard or reference speed. The engines drive similar variable pitch propellers 3 and 4 respectively which in turn are adjusted as to pitch by means of reversible electric servomotors 5 and 6 respectively geared to turn the propeller blades by means of gearing not shown. Current for operation of the servomotors is led to the respective propellers through brush and slip ring assemblies 7 and 8 respectively. The brush and slip ring assemblies are connected by means of conductors 9 and 10 to control relays 11 and 12, respectively, each being effective to control the flow of current from a direct current source such as a battery (not shown) to the propeller pitch change servomotors 5 and 6. The relays 11 and 12 are respectively controlled by engine driven centrifugal governors, generally indicated by the reference numerals 13 and 14 respectively, which governors through intermittent contact are operative to energize the respective pitch changing electric servomotors for periods of time proportional to the deviation of engine speeds from a preselected standard speed. The governors, of conventional type, are each provided with means to modify the loading of the governor spring, which is similar for both governors and is illustrated in Fig. 2 and pertains to the governor 13 of Fig. 1, the construction of governor 14 being identical.

Figure 2:
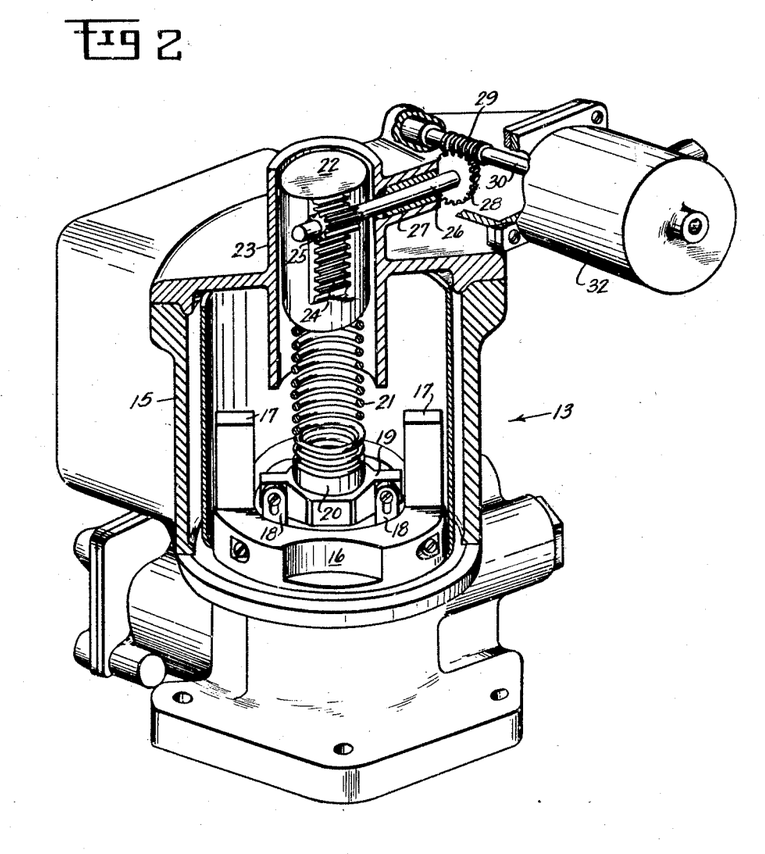
Fig. 2 is an enlarged view illustrating the type of governor head as employed in the system of Fig. 1.

Referring to Fig. 2, the governor 13 includes a housing 15 enclosing a rotatable governor head 16 adapted to be rotated by the engine and having governor weights 17 pivotally mounted thereon. The weights 17 are pivotally connected by means of links 18 to a shiftable collar 19, which is connected to a pilot valve not shown, which through a hydraulic servomotor (not shown) is adapted to position a movable contact relative to a pair of continuously oscillating relay control contacts (not shown) in accordance with the instant value of engine speed. The collar 19 carries a bearing 20 which serves as an abutment for the lower end of a speeder spring 21 which engages a shiftable abutment 22 at its upper end, the abutment being guided in a suitable bearing 23 in the housing 15. The abutment 22 is provided with rack teeth 24 which mesh with a pinion gear 25 mounted on a shaft 26 rotatably journalled in a bearing 27 provided in the housing structure. A gear 28 is secured to the outer end of shaft 26 and in turn meshes with a worm 29 secured on a shaft 30 rotatably supported in the governor housing and drivingly connected to the armature of a reversible electric motor 32. The motor 32 when selectively energized is effective to cause a desired displacement of the abutment 22 and thereby varies the loading of the speeder spring 21, to vary the speed setting of the governor. The structure so far described is well known in the prior art and per se forms no part of the present invention.

Referring again to Fig. 1, the servomotor 32 is electrically connected by means of conductors 33 to a manual three-position control switch 34 whereby the motor 32 may be energized to run in either direction for a desired length of time. The governor 13 can thus be set to maintain the speed of engine 1 at any desired value within predetermined limits and the speed of engine 1 becomes the standard or reference speed for the synchronizing system. The switch 34 is connected to a suitable source of power such as a battery (not shown).

The governor 14 is provided with a reversible electric governor setting motor 36 operable in the same manner as motor 32 and effective to control the speed setting of the governor 14, and through the variable pitch propeller 4 to control the speed of engine 2. The governor setting motor 36 is connected by means of conductors 37 and 38 to a two-position change-over switch 39 adapted in the "manual" setting position thereof to connect the conductors to a manual pitch setting control switch 40 operative to manually control the governor setting motor. In a second or "automatic" position of switch 39, the conductors 37 and 38 of motor 36 are connected respectively to conductors 41 and 42 which are associated with an automatic speed comparing or synchronizing unit generally indicated by the reference numeral 50 to effect automatic control of the governor-setting motor 36 in a manner to be hereinafter described.

As seen in Fig. 1, the master engine 1 drives a conventional three-phase tachometer alternator 45 the output leads 47 of which connect to a conventional indicator, not shown. Conductors 48 and 49 associated with the synchronizing unit 50 are respectively connected to two of the leads 47 to provide a single-phase current having a frequency proportional to the speed of engine 1 for use as a standard in the synchronizing unit. Similarly a three-phase tachometer alternator 52 is drivingly associated with controlled engine 2, the indicator output leads 54 of which respectively connect to conductors 55, 56, and 57 which are associated with synchronizer unit 50 to provide a three-phase current for comparison with the frequency standard.

In operation of the device of Fig. 1, the pilot by actuation of the manual control switch 34 causes the electric motor 32 to adjust the speeder spring of governor 13 to a desired engine speed setting and the governor then automatically controls the speed of the master engine 1 through the medium of the variable pitch propeller 3 to maintain a constant speed within small limits. By moving the switch 39 to the "automatic" position the motor 36 associated with the governor 14 is placed under the control of the synchronizing unit 50 and the latter is effective to energize the motor 36 in the proper direction, and for the necessary time duration to adjust the modifier of governor 14 to correct the speed of engine 2 to correspond to the instant speed of engine 1 whenever a speed difference occurs. The construction and operation of the synchronizer unit 50 will now be described as illustrated in Fig. 3 in which parts, in common with Fig. 1, are given the same reference numerals.

Figure 3:
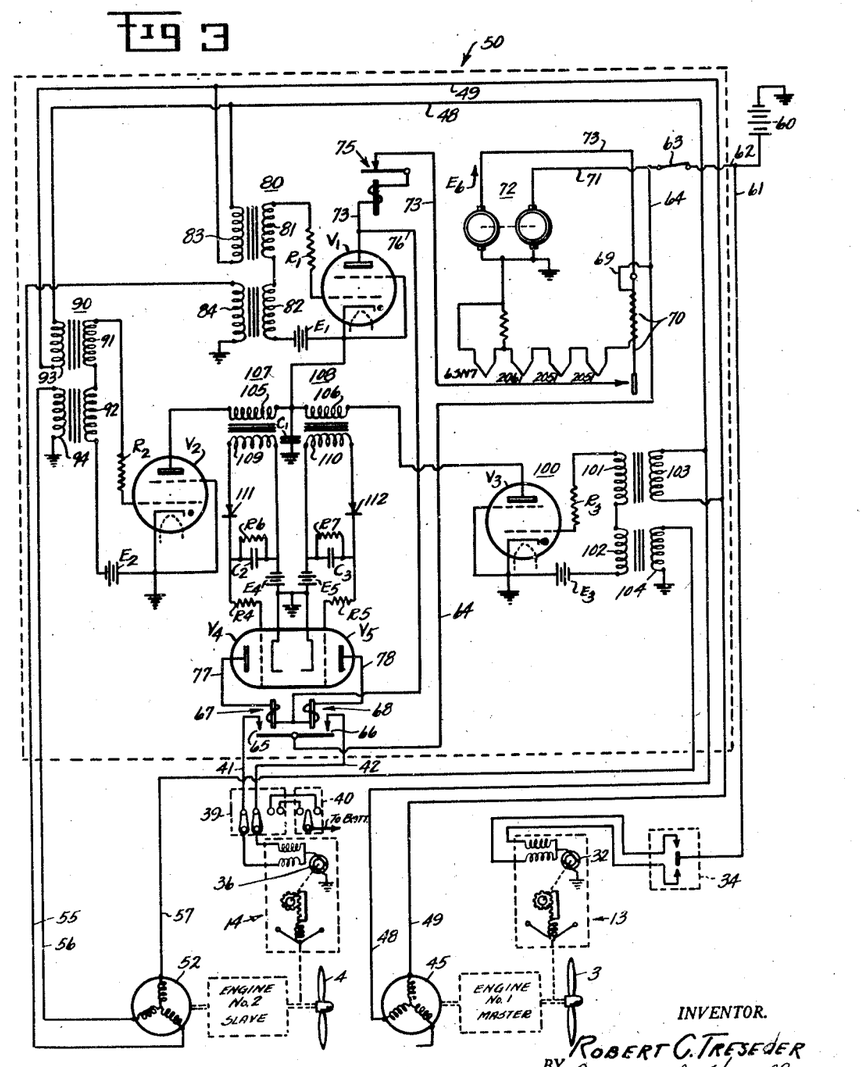
Fig. 3 is a circuit diagram of the synchronizer of Fig. 1.

Referring now to Fig. 3 the master engine 1 and controlled or slave engine 2, associated governors 13 and 14, governor-setting motors 32 and 36, control switches 34, 39 and 40 and the tachometer alternators 45 and 52, corresponding to the same elements as in Fig. 1, are schematically illustrated and will not be further described in detail. A conventional source of direct current such as a 28-volt airplane battery 60, by means of a conductor 61, supplies current through manual control switch 34 for operation of governor-setting motor 32 to determine the speed setting of the governor 13 to maintain the desired speed of master engine 1 and also serves as a current supply for a similar manual setting of governor 14 as described with reference to Fig. 1. The battery 60 by means of a conductor 62, switch 63 and conductor 64 supplies voltage to sets of relay contacts 65 and 66 associated with automatic control relays, respectively, generally indicated by reference numerals 67 and 68. The switch 63 is adapted to be manually actuated through means not shown in conjunction with switch 39 so that switch 63 is closed when switch 39 is in the "automatic" position. The sets of relay contacts 65 and 66 when closed respectively supply current to conductors 41 and 42 for selective operation of governor setting motor 36 of governor 14, when switch 39 is in the "automatic" position.

A conductor 69 also conducts battery current through the heater coil of a thermal switch 70 and to the series connected cathode heaters of the gas discharge and vacuum tubes employed in the synchronizer unit 50, the heaters being indicated by the tube type numbers appearing thereunder. A lead 71 from switch 63 conducts battery current to a dynamotor unit generally indicated at 72 which supplies an output voltage $E_6$ of 150 volts to conductor 73 for a plate current supply. The conductor 73 has serially interposed therein the contact portion of thermal switch 70 which insures that the plate supply will be cut off until the cathode heaters have reached operating temperature and an overload current protective relay 75 is also inserted in series with conductor 73 to limit plate current in the remote event that all of the gas discharge tubes employed in the synchronizer unit should be simultaneously rendered conducting. The conductor 73 is connected to the plate of a gaseous discharge tube $V_1$ (R. C. A. type 2051) whose function will be later described. A conductor 76 tapped to conductor 73 supplies plate voltage to a pair of parallel connected terminals of the coils of relays 67 and 68 and the other terminals of which are connected respectively by conductors 77 and 78 to the plates of triode vacuum tubes $V_4$ and $V_5$ which are actually in a common envelope being R. C. A. type 6SN7 and the function of which is to control the energizing of relays 67 and 68 in a manner later to be described.

The synchronizer unit 50 is provided with three gas discharge tubes known as gas tetrodes, the tubes being indicated respectively by the reference characters $V_1$, $V_2$ and $V_3$, the tubes being for example of R. C. A. type 2051. The screen grid of each tube is grounded to the cathode to provide a very sensitive triode thyratron and the control grids have impressed thereon respectively bias voltages $E_1$, $E_2$ and $E_3$ indicated as derived from a separate battery but which may be taken from the main airplane battery or from the dynamotor plate supply through suitable bleeder resistances or from a rectified source of A. C. such as from the tachometer alternator or an inverter.

The gas discharge tube $V_1$ has operatively associated therewith a coupling transformer assembly generally indicated by the reference numeral 80 which includes a pair of serially connected transformer secondary coils 81 and 82 connected to the source of bias voltage $E_1$ and at the other terminal to a grid resistance $R_1$, which in turn is connected to the control grid of the tube. The transformer assembly 80 is formed of two separate transformers, one of which includes a primary coil 83 associated with secondary 81 and connected across conductors 48 and 49 so as to have a single-phase voltage impressed thereon derived from the tachometer alternator 45 driven by master engine 1. The assembly 80 has a second transformer which includes primary coil 84 associated with secondary 82, the primary 84 having one terminal grounded and the other terminal connected to the conductor 55 from tachometer alternator 52 driven by the controlled or slave engine 2, so that primary 84 has a voltage impressed thereon from one of the three phases of alternator 52.

The synchronizer unit 50 also includes a gas tetrode $V_2$ of the same type as tube $V_1$ and which has its screen grid and cathode grounded and the latter also connected to one terminal of a source of control grid bias voltage $E_2$ such as a local battery or other current supply. A coupling transformer assembly generally indicated by the reference numeral 90 formed of two separate transformer units is associated with tube $V_2$ and includes series connected secondary coils 91 and 92 connected at one terminal to the source of bias voltage $E_2$ and at the other terminal to a grid resistance $R_2$ which is connected to the control grid of the tube. The secondary coil 91 has a primary coil 93 operatively associated therewith to form one transformer unit and which is connected across conductors 48 and 49 so as to receive the single-phase current derived from tachometer alternator 45. A primary coil 94 associated with secondary 92 to form a second transformer unit has one end grounded and has its other terminal connected to the conductor 56 and thus receives a current from a second phase of the alternator 52 and induces a current of like frequency into secondary coil 92.

The synchronizer unit 50 also includes a gas tetrode $V_3$ of the same type as tubes $V_1$ and $V_2$ and having its screen grid and cathode grounded and the latter also being connected to one terminal of a control grid bias voltage source $E_3$ such as a local battery or other suitable current source. An assembly of two coupling transformers generally indicated by the reference numeral 100 is associated with the tube $V_3$ such that two serially connected secondary coils 101 and 102 have a terminal connected to the grid voltage source $E_3$ and the remaining terminal connected to a grid resistance $R_3$ which in turn is connected to the control grid of the tube. A transformer primary coil 103 electrically coupled with the secondary 101 to form one transformer unit is connected across the conductors 48 and 49 to receive the single-phase reference current from tachometer alternator 45 driven by master engine 1. A transformer coil 104 is electrically coupled with the secondary coil 102 to form a second transformer unit and has one terminal grounded and the other terminal connected by means of conductor 57 to the third phase of the tachometer alternator 52 driven by the controlled engine 2. The current induced in the transformer secondary 104 has a frequency equal or proportional to the speed of the controlled engine 2.

Since the voltages supplied to the primary windings of the respective transformer units forming the transformer assemblies 80, 90 and 100 by the tachometer alternators 45 and 52 ordinarily vary as a function of speed, and for proper operation of the present system a nearly constant voltage is required, each transformer unit of an assembly is made with both coils wound on a common iron core and being designed to have a considerable leakage reactance.

The cathode of tube $V_1$ is connected to one terminal of a fixed condenser $C_1$ the other terminal of which is grounded and the cathode is also connected in common to the primaries 105 and 106 of a pair of transformers indicated in general by the reference numerals 107 and 108, respectively. The remaining terminals of the primaries 105 and 106 are connected respectively to the plates of the gas discharge tubes $V_2$ and $V_3$. The arrangement is such that when tube $V_1$ becomes conducting, condenser $C_1$ is charged and supplies plate potential for operation of tubes $V_2$ or $V_3$ whenever the latter become conducting. The transformers 107 and 108 have respective secondary windings 109 and 110 which, through respective rectifiers 111 and 112 and grid resistances $R_4$ and $R_5$, are connected to the grids of respective triode vacuum tubes $V_4$ and $V_5$ previously mentioned and also to sources of grid bias potential $E_4$ and $E_5$ respectively which may be local batteries as shown.

Time delay means including a fixed condenser $C_2$ and shunt leak resistance $R_6$ are connected across the output terminals of transformer secondary 109 beyond the rectifier 111. In a similar fashion a condenser $C_3$ and shunt leak resistance $R_7$ form a time delay device connected across the terminals of transformer secondary 110. The vacuum tubes $V_4$ and $V_5$ have their plates respectively connected in circuit with relays 67 and 68 as previously described.

*Operation*

The device of Fig. 1 as previously described is placed in operation by first adjusting governor 13 associated with engine 1 by operating governor-setting motor 32 under control of manual switch 34. When master engine 1 is running at the desired speed, and engine 2 is operating with the same throttle setting as engine 1, the switch 39 is then set to the "Automatic" position which also operates the switch 63, Fig. 3, to place the synchronizer unit 50 into operation, the latter then controlling the energizing of governor setting motor 36 to vary the speed setting of the governor to maintain engine 2 in synchronism with engine 1.

In operation the synchronizer unit 50, Fig. 3, receives a single phase current via conductors 48 and 49 from tachometer alternator 45, the frequency of which is equal or proportional to the speed of engine 1. The single phase reference current is applied to the primary coils 83, 93 and 103 of the respective transformer units of the transformer assemblies 80, 90 and 100 and is beat against the current applied to the primary coils 84, 94 and 104 derived from the three respective phases of tachometer alternator 52. The units of each coupling transformer assembly are arranged in voltage opposition and the resultant current in the secondaries of each assembly will have a frequency equal or proportional to the difference in speed between engines 1 and 2. The resultant beat frequency or envelope current in the transformer assemblies will also have a three phase relation with respect to each other which will change in sequence depending on whether the speed of engine 2 is greater or less than the speed of engine 1.

The instantaneous voltage applied to the control grid of each of the gas discharge tubes $V_1$, $V_2$ and $V_3$ is equal to the algebraic sum of the voltages on the secondaries of the transformer units of the respective transformer assemblies and the respective grid bias voltages $E_1$, $E_2$ and $E_3$. With respect to tube $V_1$ a certain critical voltage E (critical) is required on the control grid for a given plate to cathode potential difference to render the tube conducting and this voltage will occur a number of times per minute equal to the beat frequency, which in turn is a function of the difference in speeds of the master and controlled engines. The effects of various speed changes of the controlled engine will now be considered.

For the case when the controlled engine 2 is running in exact synchronism with master engine 1, the condition of zero beat will be produced in the coupling transformer assembly 80 so that voltages impressed on the secondaries 81 and 82 will be 180° out of phase and hence will cancel so that the grid voltage will never rise to the required E (critical) and the tube $V_1$ will remain extinguished. Under these conditions condenser $C_1$ will not be charged and hence no plate voltage will be available to tubes $V_2$ and $V_3$ and these tubes will remain extinguished even though the grid voltages equal E (critical). So long as the tubes $V_2$ and $V_3$ remain nonconducting no current will be induced in the secondary coils 109 and 110 of transformers 107 and 108 respectively and the grid voltage on vacuum tubes $V_4$ and $V_5$ will not be rendered sufficiently positive to cause them to pass plate current and relays 67 and 68 which are normally open will remain open and governor 14 will retain its last adjusted setting.

For the case when the synchronizer is in operation and the speed of engine 2 exceeds the speed of engine 1, the voltage on the control grid tube $V_1$ will reach the value of E (critical) and cause the tube to become conducting so that condenser $C_1$ will charge to a voltage equal to the plate voltage $E_6$ minus the tube drop of approximately twelve volts. When $C_1$ becomes charged tube $V_1$ will be rendered nonconducting. For a speed increase of the controlled engine the grids of the tubes will reach the value of E (critical) in the order $V_1$, $V_2$ and $V_3$ and upon the grid of tube $V_2$ reaching the critical voltage the tube will fire and condenser $C_1$ will discharge through the primary coil 105 of transformer 107 and through the plate circuit of tube $V_2$ to ground. The condenser $C_1$ is designed so as to discharge in less than one alternator cycle within the range of speeds for which synchronizing is desirable and thus the condenser $C_1$ cannot discharge through tube $V_3$ since its charge will have leaked off to a voltage insufficient to fire the latter tube when its control grid voltage reaches the value of E (critical). When condenser $C_1$ discharges through tube $V_2$ a current is induced in the secondary 109 of transformer 107 which current is rectified by rectifier 111 and charges condenser $C_2$. When the plate voltage applied by discharging condenser $C_1$ to tube $V_2$ is insufficient to overcome the discharge drop across the tube the latter will become extinguished and condenser $C_2$ will discharge.

The rate of discharge of condenser $C_2$ is primarily controlled by the value of the resistance $R_6$, which is so chosen as to insure proper relay operation. The discharge of condenser $C_2$ causes the grid of vacuum tube $V_4$ to become more positive overcoming the biasing potential $E_4$ which is of a value to bias the tube to approximate cutoff. The grid of tube $V_4$ then becomes sufficiently positive so that the tube draws plate current energizing the coil of relay 67 to momentarily close the normally open contacts 65 thereof and energize the governor-setting motor 36 to change the governor setting for a decreased engine speed.

It is readily seen that if the tachometer alternators generate one voltage cycle for each engine R. P. M., the gas discharge tubes $V_1$ and $V_2$ will become conducting once each minute for each revolution that engine 2 exceeds engine 1 so that if the speed of engine 1 is 2000 revolutions per minute and that of engine 2, 2001 revolutions per minute there will be one charging of condenser $C_1$, through tube $V_1$ and one discharge of the condenser through tube $V_2$ with a result of one pulse of relay 67 in one minute. For a speed difference of 100 R. P. M. between the controlled and master engine there will be 100 relay pulses per minute and a corresponding number of current impulses delivered to governor-setting motor 36. The average rate of operation of motor will thus be determined by the number of current impulses received per unit of time and hence, will be proportional to the off-speed condition, a condition necessary for stable governing.

By suitable design of the capacity of condensers $C_2$ and $C_3$ and resistances $R_6$ and $R_7$, the time duration of the energizing of respective vacuum tubes $V_4$ and $V_5$ can be so determined that when a certain value of speed difference between the master and controlled engines is exceeded the relay 67 or 68 will remain closed enabling governor-setting motor 36 to run at its maximum rate which is also a desirable feature.

For the case where the controlled engine 2 decreases its speed from the instant speed of master engine 1 the gas discharge tube grids will have the E (critical) voltage impressed thereon in the order $V_1$, $V_3$, and $V_2$. After tube $V_1$ fires and charges condenser $C_1$, tube $V_3$ will be fired and the condenser $C_1$ will be discharged to ground through the tube. While tube $V_3$ is conducting tube $V_2$ will be non-conducting since the condenser $C_1$ will have discharged to a voltage insufficient to fire tube $V_2$ prior to the control grid voltage on that tube having risen to the value of E (critical) and tube $V_2$ will remain non-conducting. The discharge of condenser $C_1$ through the primary coil 106 of transformer 108 induces a current in the secondary coil 110 thereof which is rectified by rectifier 112 and charges condenser $C_3$ which discharges at a controlled rate through resistance $R_7$ when tube $V_3$ becomes non-conducting. The discharge voltage of condenser $C_3$ overcomes the bias voltage $E_5$ to render the grid of vacuum tube $V_5$ more positive so that sufficient current flows in the plate circuit thereof to actuate relay 68 and close the normally open relay contacts 66. The relay 68 is operated in pulses depending on the existing value of the off-speed condition in the same manner as above described with reference to the overspeed condition relay 67. Each time relay 68 closes contacts 66, a current pulse is sent through governor-setting motor 36 to operate the same in the direction to set governor 14 to increase the speed of controlled engine 2. The proportional control, i. e. the supply of current to the governor-setting motor in impulses having a number per unit of time equal or proportional to the off-speed condition takes place for decrease in controlled engine speed in the same manner as previously described for a speed increase.

Attention is directed to the fact that the synchronizer unit 50 is also responsive to a shift in phase angle between the tachometer alternators since if there is a phase shift of a magnitude sufficient to cause the voltage on the control grid of tube $V_1$ to reach the E (critical) value, a correcting pulse will be given through one of the control relays 67 or 68 to correct for the phase shift even though the engines are exactly in synchronism as to speed. The feature of correcting for shift in phase independent of change in speed will cause a slight hunting which in practice is found to be unnoticeable because of the long interval between corrections of this character.

The synchronizing system of Figures 1 and 3 may employ an engine-driven interrupter in place of a tachometer alternator since the effect of an interrupted, direct current is the same, when applied to the coupling transformers as the frequency standard, as a single phase alternating current. It is also evident that a plurality of engines may be synchronized with reference to a standard frequency by replacing the master engine tachometer function by an adjustable frequency oscillator preferably controlled by an adjustably-tuned reed and providing one synchronizer unit for each engine with all units connected in parallel with the oscillator.

Figure 4:
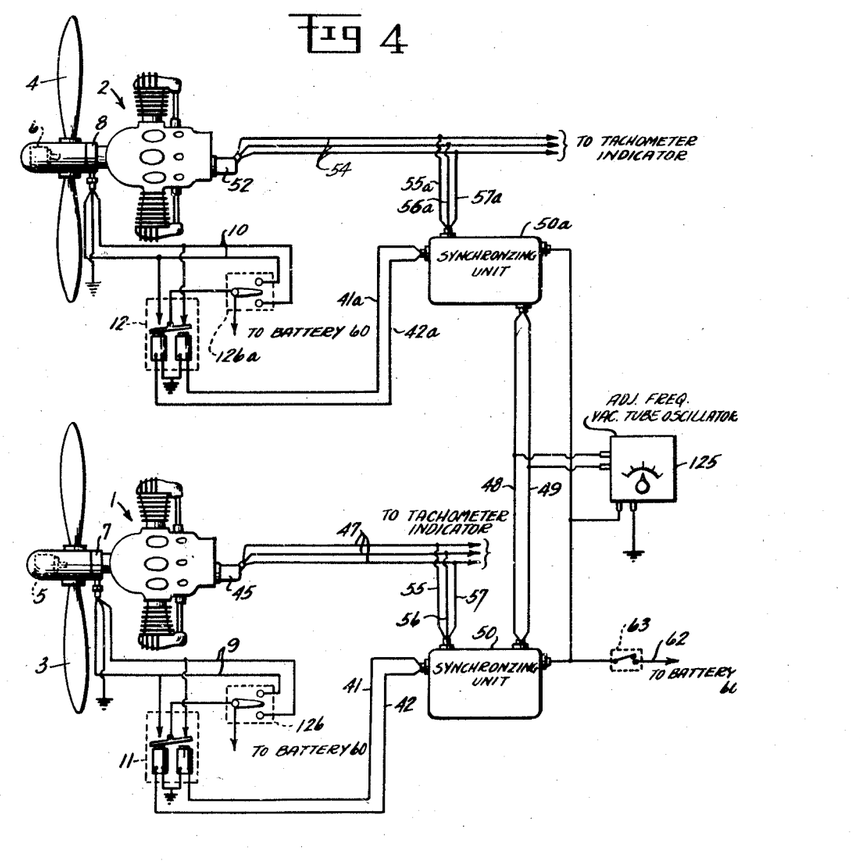
Fig. 4 is a view illustrating a modified arrangement of the device of Fig. 1 in which the synchronizer is effective to directly control the supply of current to the propeller pitch changing servomotors.

Figure 4 illustrates a modified form of the invention in which the synchronizer unit 50 is employed to directly control the speed of a pair of engines such as illustrated in Figure 1, by control of the supply of current to the pitch changing servo motors of the variable pitch propellers. In Figure 4, parts in common with the device of Figs. 1 and 3 are given the same reference numerals except that the subscript $a$ is applied to one of the sets of duplicate parts.

As seen in Fig. 4, engine 1, now a controlled engine, and controlled engine 2 drive automatic variable pitch propellers 3 and 4 respectively, the propeller pitch being controlled by reversible electric motors 5 and 6 respectively and current being supplied to the motors by means of brush and slip ring assemblies 7 and 8 supplied with current by means of conductors 9 and 10 connected to the respective double-acting power relays 11 and 12. As distinct from Fig. 1, however, the power relays 11 and 12 are selectively energized by being connected by conductors 41—42 and 41a—42a directly to the output of synchronizer units 50 and 50a of the same type as illustrated in Fig. 3 instead of being controlled by a centrifugal speed governor as in Fig. 1. The tachometer generators 45 and 52 each have the three phases thereof connected to respective synchronizer units 50 and 50a, the latter being identical with the construction illustrated in Fig. 3. In place of the master engine tachometer derived single phase reference current, the input reference frequency is generated by an adjustable frequency audio oscillator 125 preferably of the type wherein the frequency is controlled by a vibrating reed whose free length may be adjustably varied to vary the standard frequency. The oscillator 125 is connected in parallel to common input leads 48 and 49 of the synchronizing units. Switch 63 is arranged to energize both synchronizer units from the battery 60 and single pole double throw switches 126 and 126a provide for manual control of the pitch setting of the respective propellers 3 and 4.

Operation

The synchronizer units 50 and 50a, Fig. 4, operate in the same manner as unit 50 in the device of Figs. 1 and 3, in that the relays 67 and 68 thereof are adapted to be selectively closed in impulses depending upon the difference in frequency of one of the three tachometer alternator phases with the input standard frequency generated by the oscillator 125, which is adjusted so that its frequency is equal or proportional to a selected engine speed. Assuming that the pilot by manual control of the engine throttles has brought the engines to the proper speed and manually adjusted the propeller pitch by means of switches 126 and 126a, he then adjusts the frequency setting of oscillator 125 to a value corresponding to the desired engine speed and closes switch 63 energizing the oscillator and synchronizer units. If then, for example, engine 1 should be running at a speed of ten revolutions per minute in excess of the desired constant speed determined by oscillator 125, the relay 67 (Fig. 3) would pulse 10 times in one minute energizing, through conductor 41, one of the coils of double-acting power relay 11 and delivering a corresponding number of power pulses through one of conductors 9 to the pitch-changing motor 5, causing the same to run in a direction to increase the propeller pitch and decrease the speed of engine 1. Since the number of power impulses per unit of time delivered to the pitch-changing motor will be proportional to the off-speed condition, the average rate of pitch change will vary in a similar manner and stable governing will be obtained. A similar action will take place for an under-speed condition, conductor 42 and relay 11 being energized in pulses proportional to the off-speed and causing operation of the pitch-changing motor 5 in the direction to decrease propeller pitch and increase the speed of engine 1 till it equals the speed corresponding to the frequency of oscillator 125. As previously explained in the detailed description of Fig. 3, by suitable design of the value of resistances $R_6$ and $R_7$ and the capacity of condensers $C_2$ and $C_3$ the operation of vacuum tubes $V_4$ and $V_5$ may be adjusted so that relays 67 and 68 will selectively remain closed whenever the off-speed condition exceeds a predetermined value.

The control of the speed of engine 2 will occur in exactly the same manner as above described with reference to engine 1 and any number of engines can be controlled in a similar manner. Since the energy required for the control grids of the respective gas discharge tubes is negligible, the same master frequency oscillator may be employed irrespective of the number of engines to be controlled, thus gaining important savings in weight over apparatus previously employed for synchronizing.

In the synchronizer unit 50, Fig. 3, the capacity of condenser $C_1$ is so chosen that it will normally be discharged in the time required for one tachometer alternator cycle within the range of engine speeds for which engine synchronizing is desirable. If, however, the speed of a controlled engine varies with respect to the speed of master engine or speed corresponding to the reference frequency oscillator beyond the range of ⅔ to ⁴⁄₃ the desired constant speed, erratic operation of the synchronizer unit may result and ultimately may cause gas tubes $V_1$ and $V_2$ or $V_3$ simultaneously to become conducting which will then cause protective relay 75, Fig. 3, to open. The relay 75 will also open if the tubes $V_1$ and $V_2$ or $V_3$ should become simultaneously conducting for any other reason. The limits of satisfactory synchronizer operation above noted are well beyond the magnitude of speed differences ever normally encountered in aircraft flight. No special provisions to care for this condition have been found necessary, but if required, may be provided by means of limit switches actuated by the controlled engine governor, by employing an insensitive flyball governor, or by employing a balanced synchronizer cut-out relay actuated by a reactance or voltage bridge associated with each synchronizer unit.

While a preferred form of the invention has been illustrated and described, other modifications and variations will become apparent to those skilled in the art as coming within the scope of the invention as defined in the appended claims.

I claim:

1. In a frequency discriminator for determining the speed deviation of a three-phase alternator from a preset speed, means for generating a single-phase current having a frequency proportional to said pre-set speed, a plurality of frequency comparison devices each having inputs connected to a respective phase of said three-phase alternator and to said means for generating a single-phase current and having an output delivering a current having a frequency equal to the difference in frequency between the currents being compared, said comparison devices having the output voltages thereof rising to peak values sequentially in one order upon an increase in alternator speed from the pre-set speed and in a different order upon a decrease in alternator speed from the pre-set speed, a plurality of biased grid gas discharge tubes each having its grid connected to the output of a respective one of said comparison devices, a source of plate current for one of said tubes, a condenser adapted to be charged from said plate current source each time said last-named tube becomes conducting, and electrical connections between the condenser and the plates of the remaining gas discharge tubes whereby the condenser upon discharging supplies plate current to said last-named tubes, one of the latter tubes being rendered conducting upon a speed increase and the other upon a speed decrease of the alternator with respect to the pre-set speed, and the charging and selective discharging of said condenser being in cycles at a frequency proportional to the existing speed deviation.

2. A frequency discriminator adapted for use in an electrical synchronizer for maintaining the speed of a prime mover in synchronism with respect to a pre-set speed including a three phase alternator driven by the prime mover, a means for generating a single phase current having a frequency proportional to the desired prime mover speed, three grid controlled gas discharge tubes, electrical coupling means for coupling a respective one of the alternator phases and the single phase generating means to the control grid of a respective discharge tube such that the grid voltage rises to the critical voltage for the tube a number of times per minute equal to the difference in speed of the prime mover from the desired constant speed, the grid voltages on the tubes rising to the critical value sequentially in one order upon a prime mover speed increase and in a different order upon a prime mover speed decrease from the desired speed, a plate current supply for one of said tubes, a plate circuit operatively associated with said last-named tube, a condenser connected in said plate circuit and adapted to be charged while the tube is conducting and to discharge when the tube is non-conducting, and connections between the plate circuits of the remaining pair of gas discharge tubes and said condenser affording a discharge path for said condenser through each of said remaining pair of tubes when the control grid voltage thereof permits, said condenser having a discharge rate such that when one of the tubes of the said pair becomes conducting the plate voltage falls below the value required to cause the other tube of the pair to become conducting by the time the grid voltage of the latter rises to the critical value.

3. A frequency discriminating device comprising a plural phase source of alternating current whose frequency is to be determined relative to a reference frequency, a source of reference current of constant frequency, separate means for heterodyning said reference frequency current with each phase of said plural phase source to generate beat frequency currents upon occurrence of any difference in frequency of the currents being compared, said beat frequency currents having one phase relation upon an increase and a reversed relation upon a decrease in the frequency of the plural phase source relative to said reference frequency, a plurality of grid controlled gas discharge tubes each associated with one of said separate means and having its grid voltage controlled by the associated beat frequency current, one of said tubes firing in accordance with the beat frequency through the plate circuit thereof, plate circuits associated with each of the other gas discharge tubes and connected to the plate circuit of said one tube and means associated with the tube plate circuits whereby the discharge through said one tube serves as a plate supply voltage for selectively firing the tubes in the other plate circuits depending on whether the frequency of the plural phase current has increased or decreased relative to the reference current frequency.

4. A frequency discriminating device comprising means for generating a three phase alternating current having a frequency proportional to a frequency to be determined, means for developing a constant frequency reference current, separate means coupling each phase of said three phase means to said reference current to obtain separate beat frequency current outputs upon the occurrence of a frequency difference, a grid controlled vacuum tube associated with each of said coupling means and having its grid voltage controlled by the beat frequency output of the associated coupling means, the grid voltages rising to a value to permit the tubes to sequentially become conducting in one order upon a frequency increase and in another order upon a frequency decrease of the compared current relative to the reference frequency current, plate circuits associated with each tube and interconnected to each other and a plate current supply for one of said tube plate circuits adapted to supply plate voltage to the plates of the other tubes only when said one tube becomes conducting, said other tupes becoming selectively conducting respectively one on an increase and another upon a decrease in the frequency of the plural phase current relative to the reference frequency and means for limiting the conducting time of the tubes to a time interval less than that required for the grid voltages to pass through a critical value on all of the tubes.

5. A frequency difference responsive control device comprising means for generating a three phase alternating current having a frequency proportional to the instant value of a condition to be controlled, a constant reference frequency single phase source of current having a frequency proportional to the desired value of the condition to be controlled, three frequency comparison means, each coupled to a respective phase of the three phase current and to the reference frequency source, and each developing beat frequency output voltages upon a frequency difference and having one phase relation upon an increase and a reversed phase relation upon a decrease in the frequency of the plural phase current, a gas discharge tube associated with each frequency comparison means and having its grid controlled by the output thereof, a plate circuit supply for one tube, means for limiting the conducting time of said one tube to a time interval less than the time for the grid voltages of the other tubes to successively reach the critical value, and means for utilizing the current discharge pulse through said one tube for selectively firing the one of the other two tubes having its grid voltage next to reach the critical value, and circuit control means adapted to be selectively actuated by the discharge through either of said two last named tubes.

6. The structure as claimed in claim 5, in which the means for utilizing the current discharge through said one tube for selectively firing one of the other two tubes comprises a parallel connection between the cathode of said one tube and the plates of the other tubes and a condenser connected to the cathode of said one tube and adapted to accumulate a charge sufficient to serve as a plate supply voltage to fire either of the other tubes upon the grid voltage thereof rising above a critical value.

ROBERT C. TRESEDER.

REFERENCES CITED

The following references are of record in the file of this patent:

UNITED STATES PATENTS

| Number | Name | Date |
| --- | --- | --- |
| 1,490,958 | Bown | Apr. 22, 1924 |
| 1,669,524 | Kintner | May 15, 1928 |
| 2,058,114 | Usselman | Oct. 20, 1936 |
| 2,104,801 | Hansell | Jan. 11, 1938 |
| 2,176,742 | La Pierre | Oct. 17, 1939 |
| 2,246,516 | Herzog | June 24, 1941 |
| 2,258,462 | Martin | Oct. 7, 1941 |
| 2,261,145 | Dickey | Nov. 4, 1941 |
| 2,308,620 | Dear | Jan. 19, 1943 |
| 2,320,198 | Seeley | May 25, 1943 |
| 2,347,714 | Sorenson | May 2, 1944 |
| 2,382,847 | Baumann | Aug. 14, 1945 |
| 2,408,451 | Sorenson | Oct. 1, 1946 |